United States Patent [19]

Clausen et al.

[11] Patent Number: 4,616,283
[45] Date of Patent: Oct. 7, 1986

[54] APPARATUS FOR CLEANING A VIDEO PLAYER/RECORDER

[75] Inventors: Eivind Clausen; James D. Allsop, both of Bellingham, Wash.

[73] Assignee: Allsop, Inc., Bellingham, Wash.

[21] Appl. No.: 500,852

[22] Filed: Jun. 3, 1983

Related U.S. Application Data

[63] Continuation-in-part of Ser. No. 332,333, Dec. 12, 1981, Pat. No. 4,498,113, which is a continuation-in-part of Ser. No. 253,943, Apr. 14, 1981, abandoned, which is a continuation-in-part of Ser. No. 223,025, Jan. 6, 1981, Pat. No. 4,387,411, which is a continuation-in-part of Ser. No. 109,650, Jan. 4, 1980, abandoned.

[51] Int. Cl.$^4$ .............................................. G11B 5/41
[52] U.S. Cl. ..................... 360/128; 360/85; 360/95; 360/137
[58] Field of Search ............. 360/128, 85, 95, 137; 15/210 R

[56] References Cited

U.S. PATENT DOCUMENTS 3,931,643 1/1976 Kuroe ................................. 360/128
4,387,411 6/1983 Clausen et al. .................... 360/128

FOREIGN PATENT DOCUMENTS 2519457 7/1983 France .
2066999 7/1981 United Kingdom .

OTHER PUBLICATIONS

Patents Abstracts of Japan, vol. 4, No. 24 (E-173), Febrier 29, 1980, p. 111E173; & JP-A-54 162 532 (Mitsubishi Denki K.K.) 24.12.1979.

Primary Examiner—John H. Wolff
Attorney, Agent, or Firm—Hughes & Cassidy

[57] ABSTRACT

A cassette-like housing having a cleaning ribbon mounted therein and wound on a pair of spools. The housing is adapted to be positioned in a playing location of a conventional playing/recording unit to operatively engage the video head and other components of the unit to clean the same. There is a cleaning cartridge to clean the capstan and pinch roller of the unit, and this cartridge is adjustable to be moved between two separate locations. In one location, the ribbon is between the capstan and pinch roller, and in the other location, it bypasses the capstan and pinch roller. There is also a mirror device to activate the shut off mechanism.

15 Claims, 12 Drawing Figures

APPARATUS FOR CLEANING A VIDEO PLAYER/RECORDER

CROSS REFERENCE TO RELATED APPLICATIONS

This is a continuation-in-part of Ser. No. 332,333, Dec. 21, 1981, U.S. Pat. No. 4,498,113, which is a continuation-in-part of Ser. No. 253,943, Apr. 14, 1981, abandoned, which is a continuation-in-part of Ser. No. 223,025, Jan. 6, 1981, U.S. Pat. No. 4,387,411, which is a continuation-in-part of Ser. No. 109,650, Jan. 4, 1980, abandoned.

TECHNICAL FIELD

The present invention relates to an apparatus and method for cleaning operating components of a video player/recorder.

BACKGROUND ART

In video player/recorders, typically there is a rotating video head which records and/or plays back the video portion of a playing tape, an audio head, an erase head, and possibly other components which engage the tape. For proper operation of the player/recorder, it is desirable that the surface portions of these components be cleaned periodically.

The prior art shows various cassette-like devices which have cleaning elements to engage the operating components of audio or video player/recorders. Some of these use reciprocating or rotating cleaning members. Some move a ribbon past the various components.

In many video player/recorder units there are a number of factors which add complexities to a cleaning operation. For example, some of the operating components are placed so that the tape must be moved by guide members a relatively large distance into the operating area of the unit to engage the operating components. Also, the drive mechanisms which rotate the spools of the cassette on which the tape is wound operate differently depending on the make or model number. Further, in some of these units, there is provided a capstan and pinch roller which engage the tape to move it at a proper speed through the unit. Generally, there are certain automatic shut off mechanisms which become operational when the various operating components are not functioning in a compatible manner.

In view of this, it is an object of the present invention to provide a method and apparatus for cleaning a video player/recorder, which method and apparatus can effectively and reliably clean operating components, and yet make accommodations for the variations which may exist in the operating components and/or shut off mechanisms in the unit.

DISCLOSURE OF THE INVENTION

The cleaning apparatus of the present invention is adapted to clean a playing and/or recording apparatus, wherein the playing and/or recording apparatus comprises:

(a) a structure defining an operating location to receive a tape cassette in an operating position in the operating location;

(b) at least one head member which has a head surface that is subject to contamination;

(c) guide means adapted to engage a tape of said tape cassette at a tape engaging location and move said tape outwardly to a head engaging location;

(d) a capstan and pinch roller at a capstan and pinch roller location to engage the tape and move said tape through the playing and/or recording apparatus;

(e) drive spindles to engage spools of said tape cassette so as to cause rotation of the same.

The cleaning apparatus comprises a cassette housing adapted to be positioned in the operating location of the playing and/or recording apparatus. The cassette housing has a forward end, a rear end, and first and second side portions.

There is a cleaning ribbon having a lengthwise axis and positioned in the cassette housing so as to have a guide engaging ribbon portion which, when the cassette housing is located in an operating location in the unit, it is positioned to be engaged by the guide means and moved from the cassette housing into a cleaning position. In the cleaning position, the ribbon engages at least the head, and the ribbon is so mounted in the cassette housing so as to be able to travel from and into the cassette housing in a path along the lengthwise axis of the ribbon.

There is a capstan and pinch roller cleaning device mounted in the cassette housing and having a first cleaning position to engage the capstan and pinch roller in cleaning engagement at the capstan and pinch roller location. The cleaning device is movable to a second location removed from the capstan and pinch roller location.

Further, there is a ribbon locating means having a first locating mode to locate the ribbon on a path bypassing the capstan and pinch roller. It also has a second locating mode to locate the ribbon between the capstan and pinch roller.

With this arrangement, with the cleaning device in its first cleaning position and a ribbon locating means in its first locating mode, the cleaning device is able to be in cleaning engagement with the capstan and pinch roller, with the ribbon bypassing the capstan and pinch roller. With the cleaning device in its second location and the ribbon locating means in its second locating mode, the ribbon is engaged by the capstan and pinch roller to be moved by the capstan and pinch roller in its path along the lengthwise axis of the ribbon.

In the preferred form, the capstan and pinch roller cleaning device and the ribbon locating means are mounted to a mounting member which is in turn movably mounted in the cassette housing. The mounting member is movable between first and second mounting member locations to move the cleaning device between its first and second locations and to move the ribbon locating means between its first and second locating modes. The mounting member and cassette housing have cooperating slot and pin positioning means, whereby the mounting member can be moved between its first and second locations along the positioning means. More particularly, the pin and slot positioning means comprises a first slot means formed in the cassette housing and extending in a lateral direction, and second slot means formed in the cassette housing and also extending in a generally lateral direction. The mounting member has first and second pin means interfitting with the first and second slot means.

Desirably, the first and second slot means are located on opposite sides of the capstan and pinch roller cleaning device, and at least one of the slot means is slanted from a lateral axis so as to cause rotation of the mounting member as it is moved between its first and second locations. At least one of the pin means is mounted to a yielding member which is adapted to engage first and second locating detents in the cassette housing to locate the mounting member in its first and second locations.

Preferably, the first and second slot means are provided with an end portion opening from the cassette housing, whereby the mounting member can be employed as a removable cartridge to be inserted into the cassette housing and removed therefrom.

In the preferred form, the cleaning device of the present invention is adapted to be used in a playing and/or recording apparatus which has a shut off mechanism comprising first and second shut off devices spaced from one another. One of the shut off devices is a light emitting member, and the other of the shut off devices is a light responsive member. The shut off device is positioned so that when the tape cassette is in the operating location, the tape is positioned to interrupt a light beam travelling a light beam path between the first and second shut off devices. When a shut off leader of the tape is at the light beam path, the shut off mechanism is activated.

The cleaning apparatus of the present invention has a shield member having a beam interrupting position to interrupt the light beam path between the shut off devices, and a beam transmitting position to permit the light beam to travel on the light beam path between the shut off devices. The cleaning apparatus further comprises a drive transmission adapted to be operatively engaged with one of the drive members of the playing and/or recording apparatus to move the shield between its first and second positions. Thus, the cleaning apparatus can be caused to move through a cleaning cycle as the drive transmission moves the shield from the first to the second stop positions.

Desirably, the shield member comprises a rotatable member positioned around one of said shut off devices, and the transmission comprises a speed reducing transmission to rotate the shield at a rotational rate slower than the rotation of the drive member to which the transmission is operatively connected. Preferably, the transmission comprises a speed reducing gear transmission operatively connected between the shield and the drive member.

In the preferred form, the cleaning apparatus further comprises a pair of spools mounted in the cassette housing and adapted to have the ribbon wound thereon. At least one of the spools is provided with gear means to operatively engage the gear transmission. Thus, rotation of the spool to move the ribbon causes rotation of the shield. Also, in the preferred form, there are mirror means to reflect the light beam on a nonlinear path between the first and second shut off devices. Further, there is a lens means located on the light beam path to concentrate the light beam to an intensity sufficient to activate the shut off mechanism.

Other features will become apparent from the following detailed description.

BEST MODE FOR CARRYING OUT THE INVENTION

As indicated previously, the present invention is particularly adapted to clean the operating components of a video recording/playing unit which is adapted to accept a cassette-type playing tape. Accordingly, it is believed that a clearer understanding of the present invention will be obtained by first describing some of the operating components of a conventional video playing/recording unit, for which the present invention is particularly adapted to be used. In the following description, the video playing/recording unit 10 will be referred to as "the video unit" or simply as "the unit".

In FIGS. 1 and 3-6, only some of the main operating components of the video unit 10 are shown in plan view and in rather schematic form. The housing, circuit components, operating knobs, and certain other components of the video unit 10 are not shown, since a showing of these is not required for an understanding of the present invention. Rather, there are shown only those operating components which are directly affected in the operation of the present invention. The unit 10 comprises a case or housing 12 which defines a cassette receiving location or cavity, indicated at 14. Only a very small portion of the case 12 is shown fragmentarily. A conventional tape cassette (not shown herein) which normally fits in the location or cavity 14 comprises a cassette housing with a generally rectangular configuration. There are two spools rotatably mounted in the housing, and a magnetic tape is wound on these spools and extended across the front of the cassette housing. In operation, guide means of the unit 10 engage the magnetic tape and carry it outwardly from the cassette housing to its operating position.

To proceed now to a description of the operating components of the video unit 10, there are three magnetic operating components which either respond to the magnetic signals on the magnetic tape, affect the signals on the tape, or do both of these. These components are: an erase head 16, a rotating video head 18, and an audio head 20. As its name implies, the erase head 16 can be operated to cause erasure of the magnetic signals on the magnetic tape. The video head 18 can operate either as a play back head or a recording head. The video head 18 has the general configuration of a circular disc (i.e. a shallow cylinder), and has a peripheral, cylindrically-shaped operating surface 22. On this surface 22, there are one or more scanning elements 24, and the head 18 rotates about the center axis 26 of the cylindrical surface 22. The head 18 is slanted moderately from the horizontal so that the center axis 26 is canted or angled moderately from a line perpendicular to the plane of the tape cassette which is played by the unit 10. Also there is a stationary guide member 27.

The audio head 20 operates on the audio portion of the magnetic tape to either play back audio signals or to record audio signals when the unit 10 is in its recording mode. Also, the audio head 20 can, in some instances, perform an erasing function.

Figure 1:
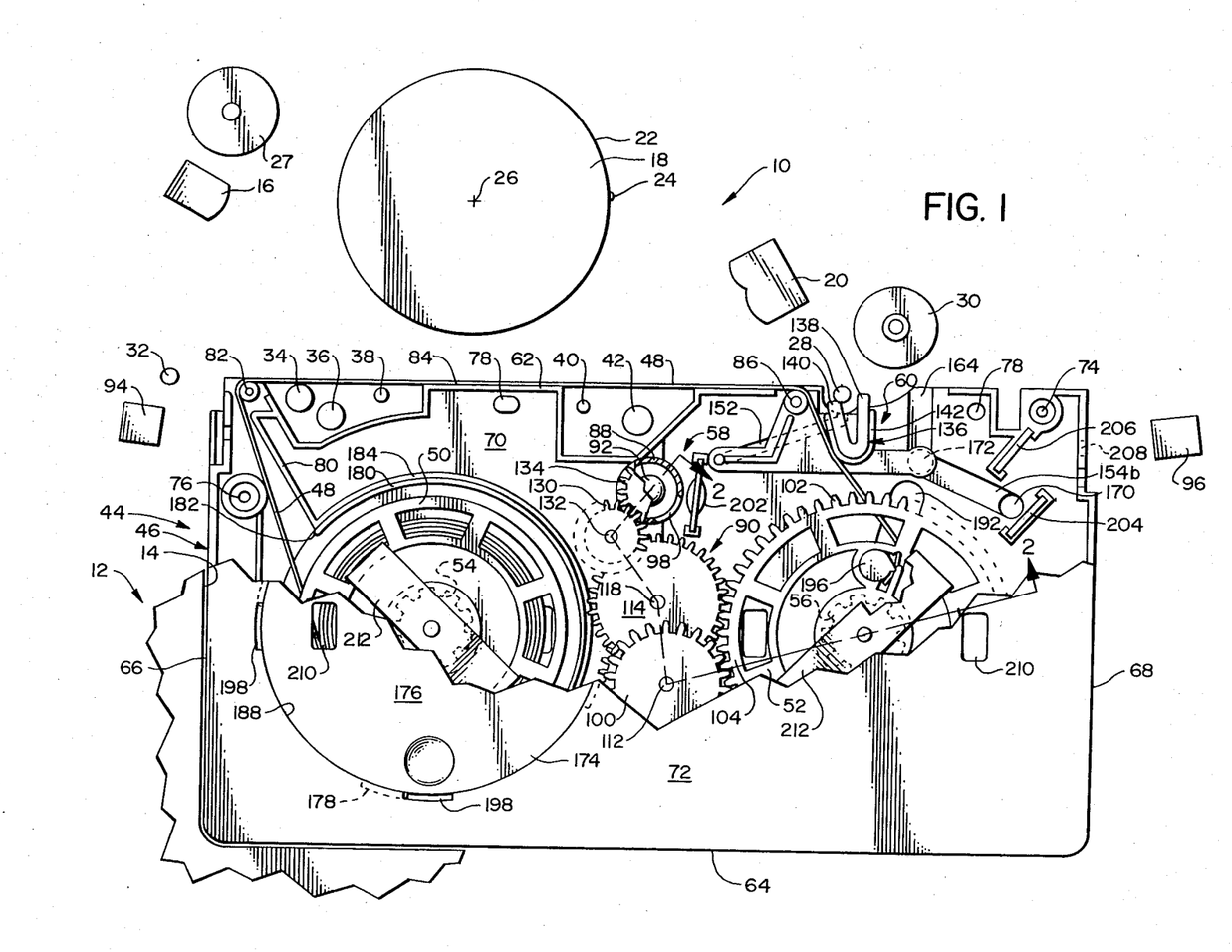
FIG. 1 is a top plan view illustrating the apparatus of the present invention, with a portion of the top cover of the same cut away for purposes of illustration, and also showing certain components of the unit to which it is mounted, these components being those with which the present invention cooperates more directly in its operation.

The unit 10 further comprises a capstan 28 and pinch roller 30. As shown in FIG. 1, the pinch roller 30 is spaced from the capstan 28. In the operation of the unit 10, the pinch roller 30 moves to a position adjacent the capstan 28 so as to engage the magnetic tape therebetween, with the rotation of the capstan 28 causing the magnetic tape to move at a controlled rate through the unit 10.

Figure 3:
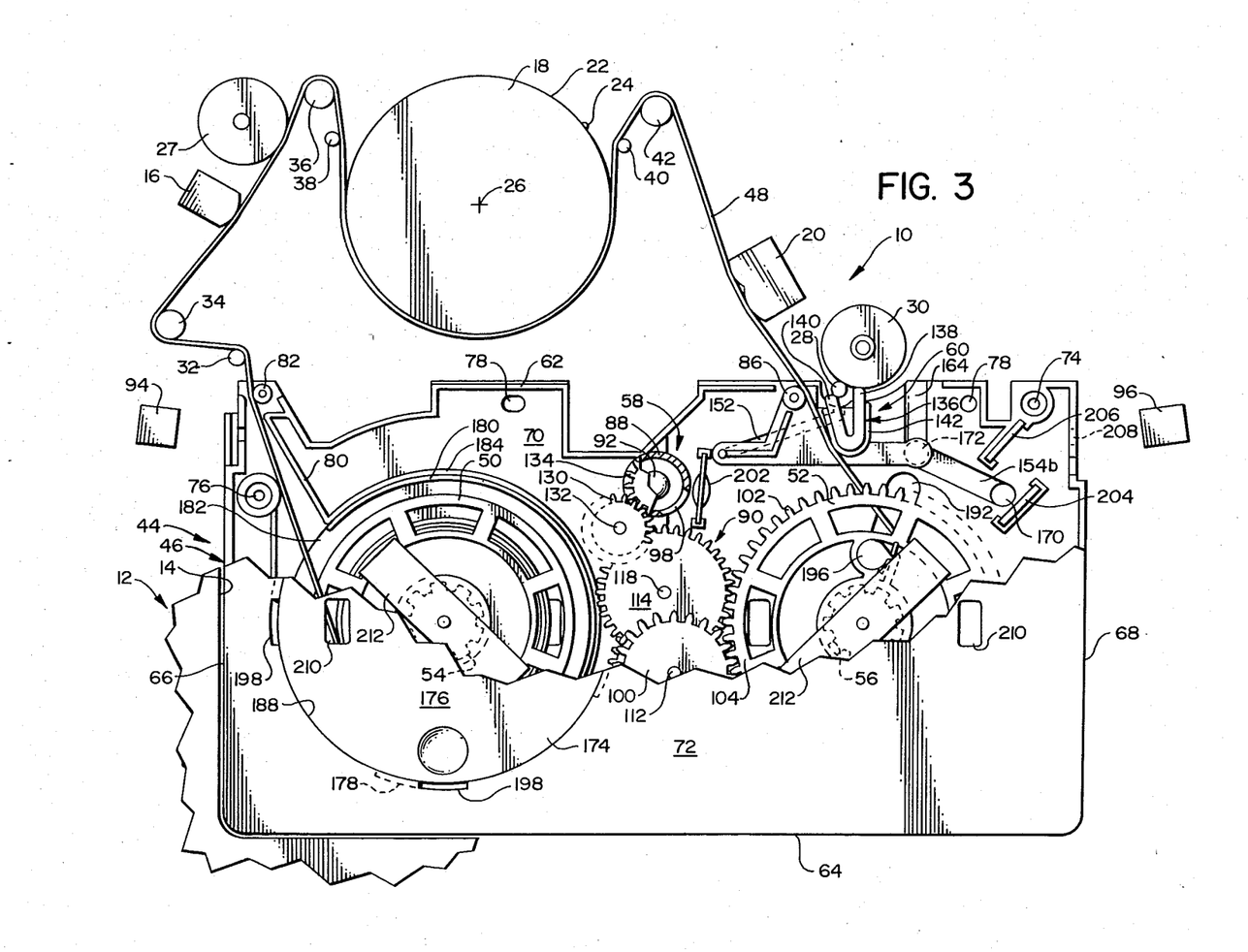
FIG. 3 is a view similar to FIG. 1, but showing the cleaning ribbon of the present invention moved to its cleaning position at the start of a cleaning cycle, and also showing the capstan and pinch roller cleaning device in its cleaning position.

There are six movable guide members designated 32–42, respectively. The guide member 32 is located in its nonoperating position moderately to the left of the front left corner of the cassette receiving cavity or location 14. Three of the guide members 34, 36 and 38 are positioned at the left forward portion of the cassette location or cavity 14. The remaining two guide members 40 and 42 are positioned at the middle forward area of the cassette location or cavity 14. When a conventional tape cassette is placed in the cavity 14, and the unit 10 is operated to move the conventional magnetic tape into its operating position, these five guide members 34, 36, 38, 40 and 42 engage the back surface of the magnetic tape and move it out to engagement with the components 16, 18 and 20, and the guide member 32 moves moderately to the right. This is shown in FIG. 3.

To proceed now to a description of the cleaner 44 of the present invention, there is a generally rectangular cassette housing 46 having the same overall configuration of the case or housing of a conventional tape cassette that is played in the unit 10. There is a cleaning ribbon 48 which is wound on a pair of left and right spools 50 and 52, respectively, these spools 50 and 52 being located in generally the same manner as spools of a conventional tape cassette, so as to be able to engage the left and right drive spindles 54 and 56 which are part of the components of the conventional unit 10.

The cleaner 44 further comprises a stop mechanism 58 which functions to stop the operation of the unit 10 at the completion of a cleaning cycle. Finally, there is an adjustable cleaning cartridge 60 which cleans the capstan 28 and pinch roller 30. As will be described more fully hereinafter, this cartridge 60 has two operating positions to accommodate variations in the operating characteristics of the particular unit 10 in which it is being used.

To proceed now to a more detailed description of the present invention, the cassette housing 46 can be considered as having a forward wall portion 62, a rear wall portion 64, left and right walls 66 and 68, respectively, a bottom wall 70 and a top wall 72. This housing 46 can conveniently be made as upper and lower sections, secured one to another by screws or other fasteners at locations such as those indicated at 74 and 76. Also, the housing 46 has appropriate openings, as at 78 to accommodate locating members or other existing components of the unit 10. The housing 46 can have reinforcing ribs 80 at various locations.

One end of the ribbon 48 is wound on the left spool 50 and extends from the left side thereof forwardly around a locating roller 82 at the front left corner of the housing 46 and thence along the front of the housing at 84. The ribbon then extends around a second locating roller 86 and thence rearwardly to the right side of the right spool 52 so as to be able to be wound thereon. This right locating roller 86 is mounted to the cleaning cartridge 60 so as to be movable therewith. This particular feature is significant in the operation of the present invention, and will be described more fully later herein.

The stop mechanism 58 comprises a generally cylindrical shield 88 and a speed reducing gear transmission 90. The shield 88 fits over a light source 92 which already exists in the unit 10 as part of the existing shut off mechanism of the unit 10. In the normal operation of a conventional tape cassette, there is a portion of clear leader at each end of the magnetic tape. When this clear leader unwinds from either of the tape spools, it permits the light source 92 to shine through to activate either a left shut off device 94 or a right shut off device 96, these devices 94 and 96 being existing components of the unit 10.

In the present invention, the cylindrical shield 88 functions to close the light source 92, except to permit transmission of a light beam through a window 98 formed in the side wall of the shield 88. As will be described more fully hereinafter, in the position of FIG. 1, the shield 88 is positioned for the start of a cleaning cycle, while in FIG. 4, the shield 88 is positioned to permit the light source 92 to transmit a beam to the shut off device 94 and stop the cleaning cycle of the cleaner 44.

Figure 2:
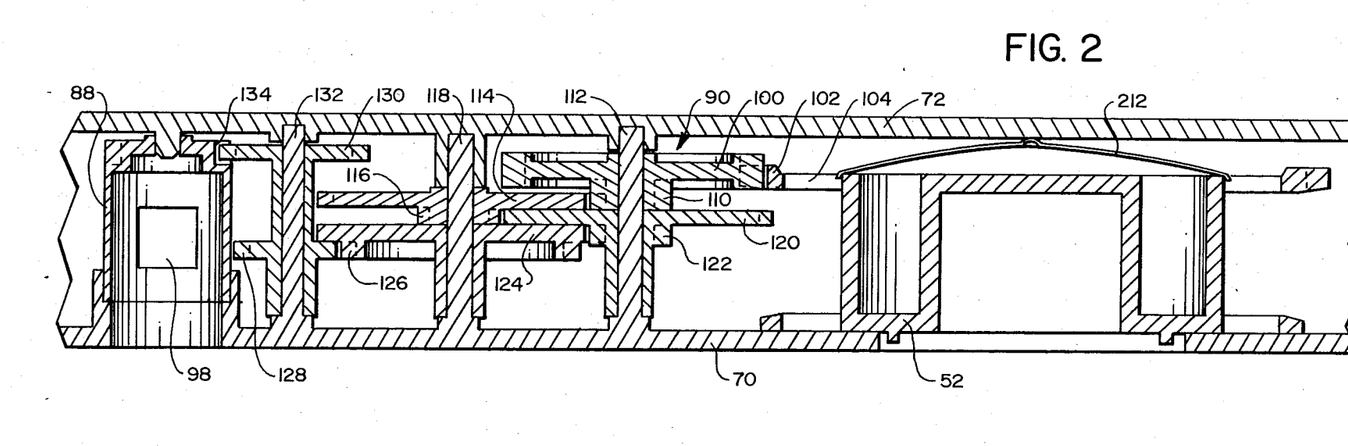
FIG. 2 is a sectional view taken along line 2—2 of FIG. 1, and showing the speed reducing gear transmission to operate the stop mechanism of the present invention.

The aforementioned speed reducing gear transmission 90 comprises a first gear 100 which engages a gear 102 formed as part of the upper annular flange 104 of the right spool 52. As shown in FIG. 2, the gear 100 is fixedly attached to a smaller gear 110, with both gears 100 and 110 being rotatably mounted on a shaft 112. The gear 110 engages a larger gear 114 which is in turn fixedly attached to a smaller gear 116, the gears 114 and 116 being rotatably mounted on a second shaft 118. The smaller gear 116 in turn engages a larger gear 120 fixedly attached to a smaller gear 122, these gears 120 and 122 being rotatably mounted on the shaft 112. The smaller gear 122 engages a larger gear 124 which is in turn fixedly attached to the gear 126, both of the gears 124 and 126 rotatably mounted on the shaft 118. The gear 126 engages a smaller gear 128 that is in turn fixedly attached to a gear 130, both of the gears 128 and 130 being mounted for rotation about a shaft 132. Finally, the gear 130 engages a gear 134 that is formed as part of the shield 88 at the upper portion thereof. The overall effect of the speed reducing transmission 90 is to cause the shield 88 to rotate at approximately 10% of the speed of rotation of the right spool 52.

The aforementioned cleaning cartridge 60 performs two functions. First, by means of its locating roller 86, it properly locates the cleaning ribbon 48 in one of two operating positions. Second, the cartridge 60 has a cleaning pad 136 which, in one operating mode, can clean both the capstan 28 and the pinch roller 30. As shown herein, this cleaning pad 136 is made of a single elongate pad element which is folded back on itself to provide a first forwardly extending finger 138 to engage the pinch roller 30, and a second forwardly extending finger 140 to engage the capstan 28. The pad 136 is conveniently housed in a U-shaped locating member 142. The ribbon 48 extends between the locating roller 86 and the pad 136.

Figure 4:
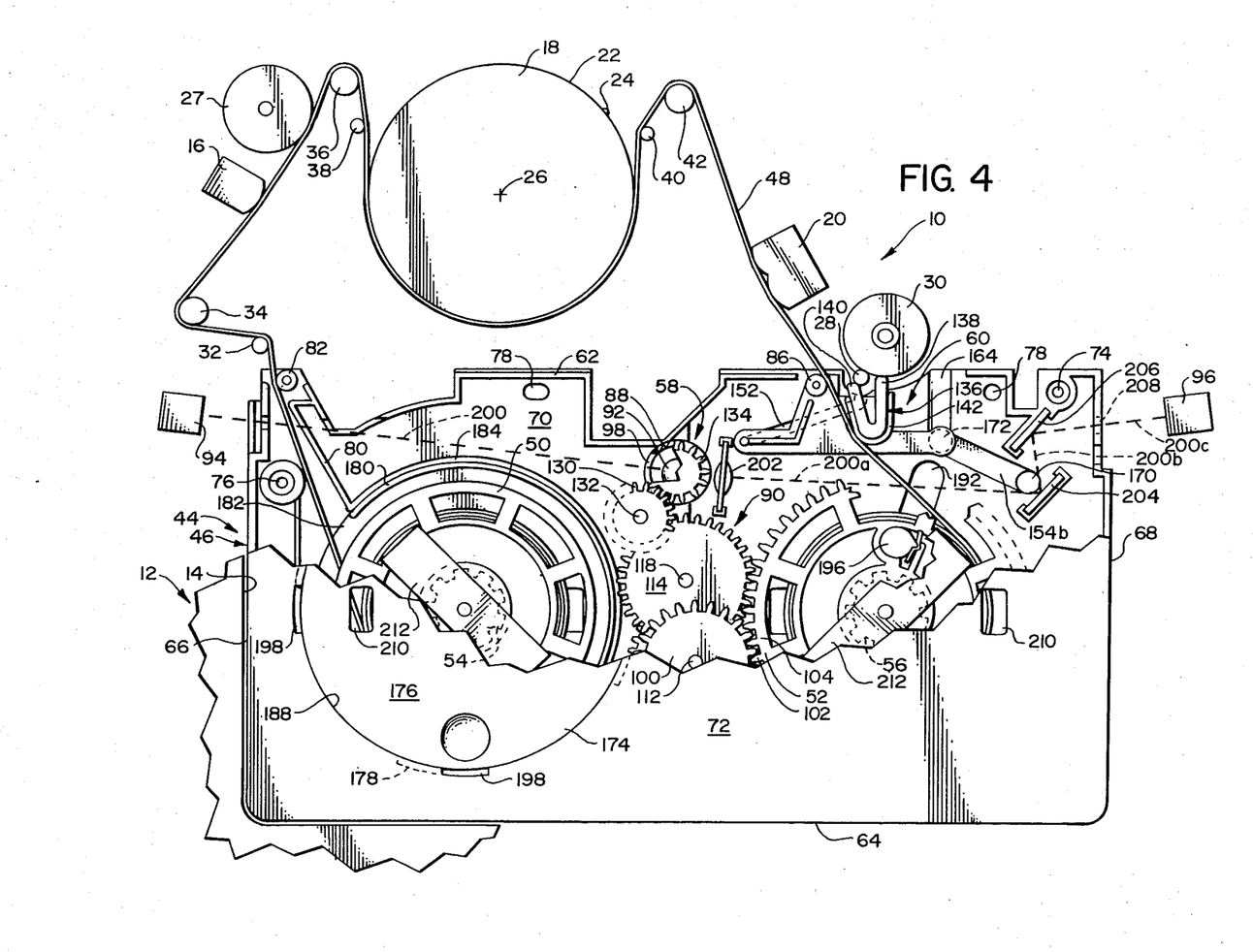
FIG. 4 is a view similar to FIG. 3, showing the stop mechanism in a position to end the cleaning cycle of the apparatus of the present invention.
Figure 5:
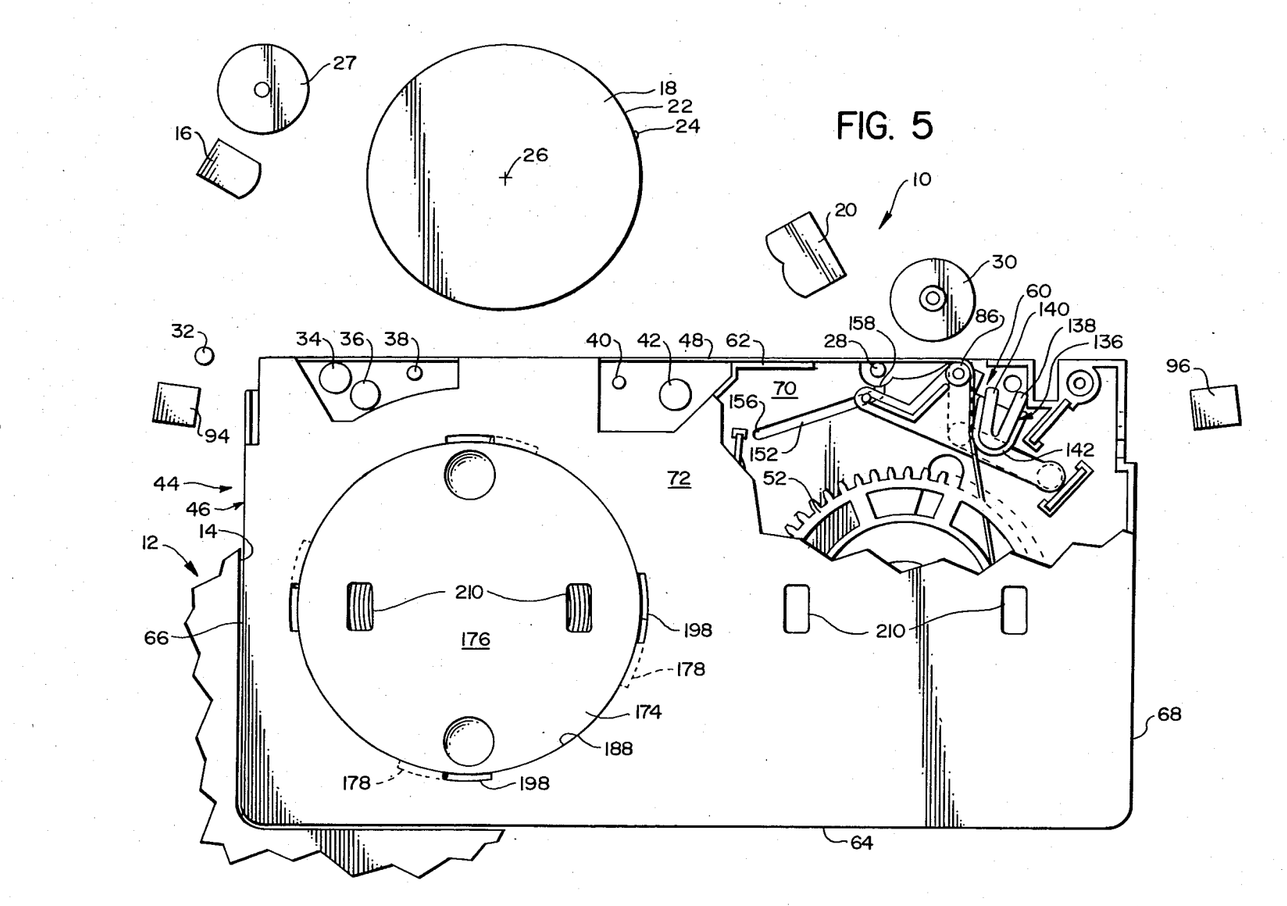
FIG. 5 is a view similar to Figure 1, but showing the capstan and pinch roller cleaning device and the cartridge on which it is mounted moved to a second operating position.
Figure 6:
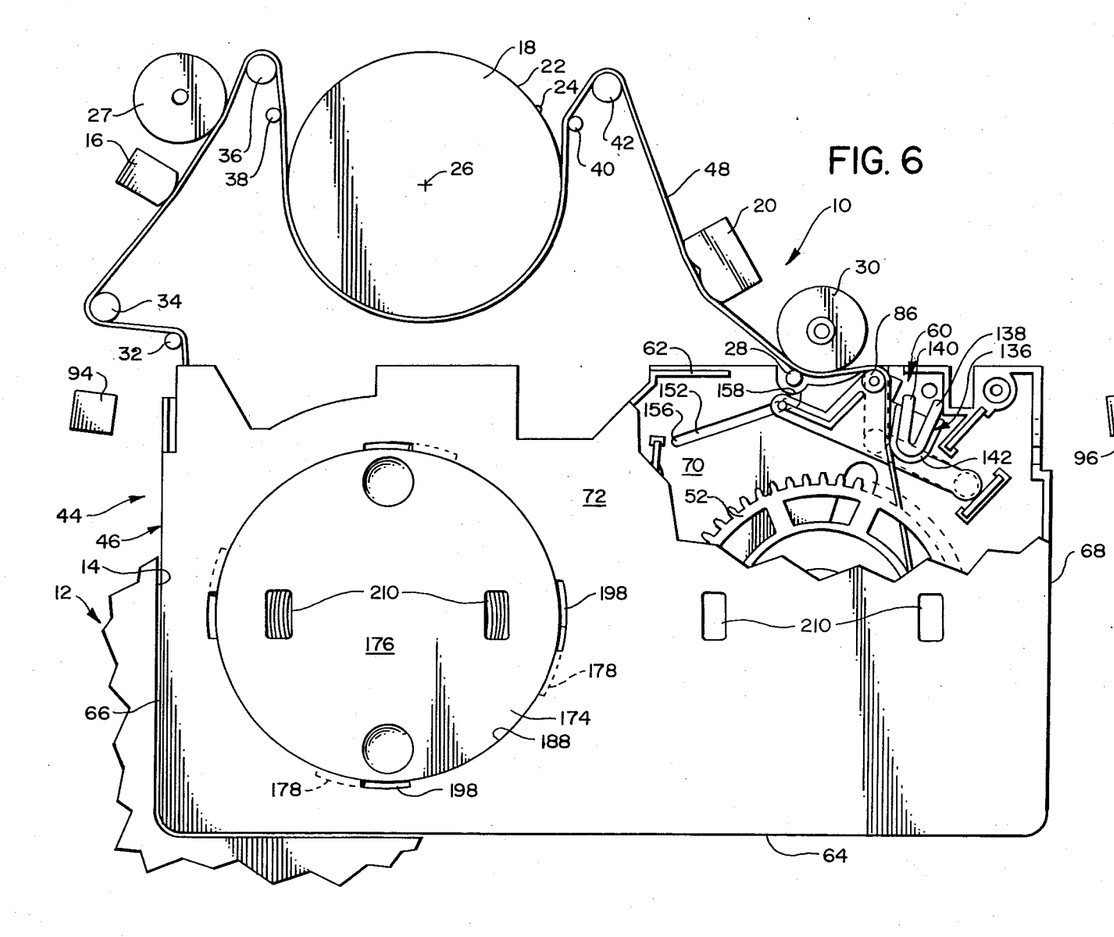
FIG. 6 is a view similar to FIG. 3, but showing the cleaning ribbon in its operating position with the capstan and pinch roller cartridge in the position shown in FIG. 5.
Figure 7:
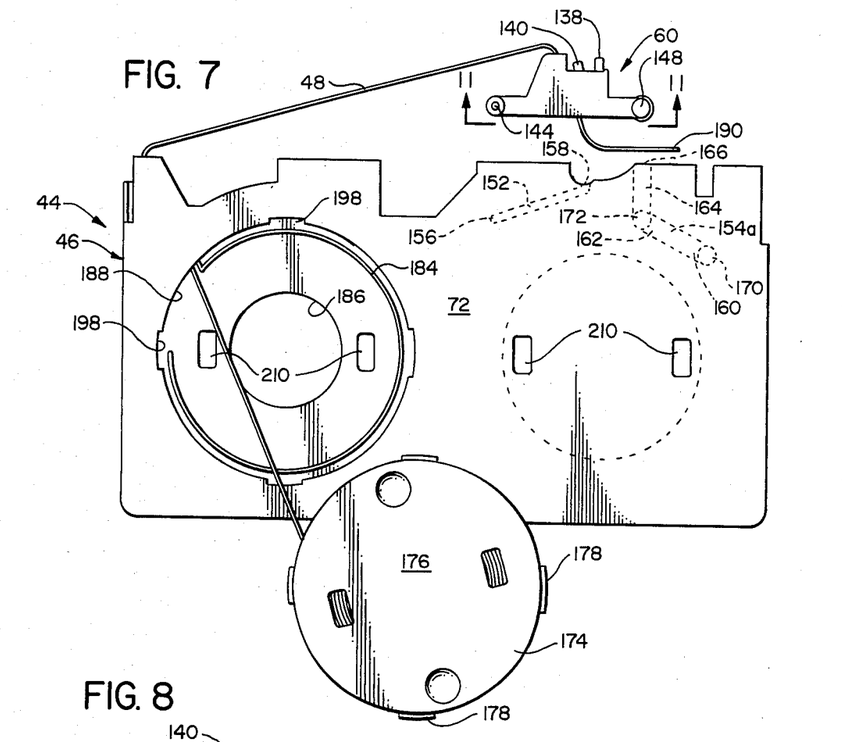
FIG. 7 is a top plan view of the cassette cleaner of the present invention, showing the manner in which a cartridge containing a spool with a cleaning ribbon thereon and the capstan and pinch roller cleaning cartridge can be inserted into the cassette housing.
Figure 8:
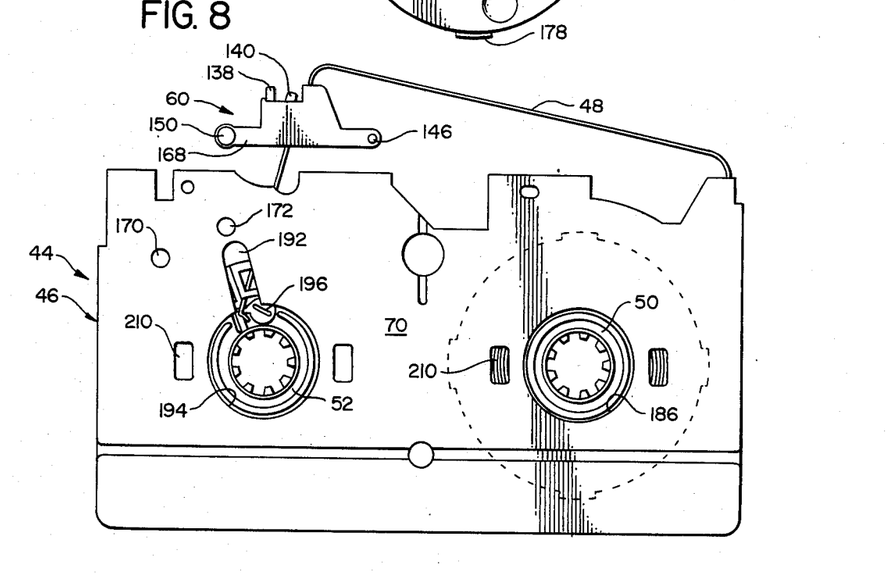
FIG. 8 is a bottom plan view showing both spools in place in the cassette housing and illustrating the manner in which the cleaning ribbon from the capstan and pinch roller cleaning cartridge is connected to the spool positioned adjacent the capstan and pinch roller cleaning cartridge.

The cleaning cartridge 60 has two operating positions, the first of which is shown in FIGS. 1, 3 and 4, and the second of which is shown in FIGS. 5 and 6. In the first position, the pad 136 is located to engage the capstan 28 and pinch roller 30 in cleaning engagement, and the locating roller 86 is located to the left of the capstan 28 so that the cleaning ribbon 48 bypasses the capstan 28 and pinch roller 30 to extend direcly from the locating roller 86 to the spool 52. In the second position (shown in FIGS. 5 and 6), the cartridge 60 is further to the right, and the pad 136 is no longer in a position to engage the capstan 28 and pinch roller 30. However, the locating roller 82 is positioned further to the right, so that the cleaning ribbon front portion 84 is located between the capstan 28 and pinch roller 30.

The reason for providing the two positions of the cartridge 60 is to provide the cleaner 44 with the versatility to be compatible with different drive mechanisms of the unit 10. This will be described more fully later herein when the overall operation of the cleaner 44 is presented in more detail. However, to indicate briefly the reason for this arrangement, in some units an automatic shut off mechanism is triggered if the capstan 28 and pinch roller 30 are not in engagement with a magnetic tape of a tape cassette or other object simulating such a magnetic tape. For these units, the cartridge 60 is placed in the further right position, shown in FIGS. 5 and 6. On the other hand, by positioning the cartridge 60 in the left hand position, shown in FIGS. 1, 3 and 4, it is possible to place the stationary cleaning pad 136 into cleaning engagement with the capstan 28 and pinch roller 30, so as to enhance the cleaning of these components 28 and 30.

To mount the cartridge 60 in these two positions, the cartridge 60 has a pair of upper and lower left locating pins 144 and 146, respectively, and a pair of upper and lower right locating pins 148 and 150, respectively. The two left pins 144 and 146 ride in a pair of matching upper and lower left slots, both of which are designated 152, and which are formed in the upper and lower cassette housing walls 72 and 70, respectively. The right locating pins 148 and 150 engage a pair of right upper and lower slots 154a and 154b.

The left pair of slots 152 extend from a more rearward left end thereof at 156 in a moderate forward slant to open at 158 at the front of the cassette housing 46. The right slots 154a and 154b extend from a right rear end 160 in a left and moderately forward slant to a left end location 162. From the location 162, there is yet a third pair of upper and lower slots 164 which extend forwardly to open at the front end of the cassette housing 46 at 166.

So that the cartridge 60 can be located securely in either of its two operating positions, the lower right locating pin 150 is mounted on a spring-like arm 168 which urges the lower right locating pin 150 downwardly. The lower right slot 154b has at its right end a through opening 170 in the lower wall 70 of the cassette housing 46, and a second left through opening 172 at the left end of the lower right slot 154b (i.e. at the juncture of the lower slot 154b and the lower slot 164).

Figure 12:
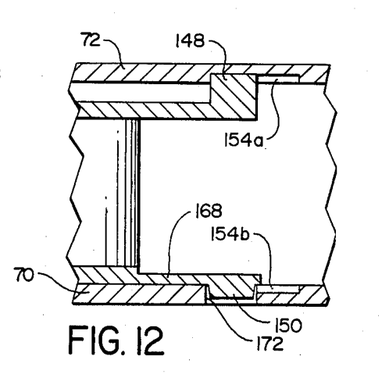
FIG. 12 is a view taken along line 12—12 of FIG. 10.

When the cleaning cartridge 60 is in the left hand position of FIG. 1, the lower right locating pin 150 reaches into the left opening 172 (as shown in FIG. 12) to hold the cartridge 60 in that position. When it is desired to move the cartridge 60 from the left hand position of FIG. 1 to the right hand position in FIG. 5, it is only necessary to position a pencil or other narrow object adjacent the bottom housing wall 70 and press inwardly against the pin 150 to move it out of the opening 172. Then the cartridge 60 can be moved to the right, with the right set of pins 148 and 150 sliding in their respective slots 154a and 154b, and the two left locating pins 144 and 146 sliding in their slots 152. When the cleaning cartridge 60 has reached the right hand position of FIG. 5, the lower right pin 150 springs into engagement with the right opening 170, thus holding the cartridge 60 in the right hand position. To move the cartridge 60 from that right hand location, again a pencil or other pointed object is pressed against the right locating pin 150 to move it out of the opening 170, and the cartridge 60 is then moved to the left.

Also, the cartridge 60 can be moved out of the cassette housing 46 from the left hand position of FIG. 1. This is accomplished, again by using a pencil or other sharp object to move the pin 150 out of engagement with the opening 172, and then sliding the two locating pins 148 and 150 forwardly through the upper and lower front slots 164. At the same time, the two left locating pins 144 and 146 are slid to the right in their slots 152 and removed from the front end 158 of the slots 152.

The cleaner 44 is so arranged that the cleaning ribbon 48 and also the cleaning cartridge 60 can conveniently be replaced in the cassette housing 46, and this will be explained with reference to FIGS. 7-10. The left spool 50 is made as a removable cartridge 174 having a top wall 176 and four locking tabs 178 located on the periphery of the top circular wall 176. The cartridge 174 has suitable enclosure structure to support the spool 50 itself so that it can rotate within the cartridge 174. Specifically, the cartridge 174 has a side wall 180 with a cutout 182 to permit the ribbon 48 to extend outwardly from the spool 50. The bottom wall 70 of the housing 46 has a circular locating rib 184 to receive the cartridge in the proper position and a central opening 186 to permit the left spool 50 to be engaged by the drive spindle 54.

To install the cartridge 174 with the spool 50, and also to install the cleaning cartridge 60, first the ribbon 48 is unwound from the spool in the cartridge 174 so as to extend through the circular cartridge receiving opening 188 formed in the cassette housing top wall 72, and outwardly from the left front corner of the cassette housing 46 so as to extend around the left front guide roller 82. The ribbon is then inserted through the cleaning cartridge 60 so as to be positioned around the right locating roller 86 so as to be positioned between the roller 86 and the capstan and pinch roller cleaning pad 136.

Next, the end 190 of the ribbon 48 is connected to the right spool 52. To accomplish this, the bottom wall 70 of the cassette housing 46 is formed with a cutout 192 which extends radially from a bottom wall opening 194 which is made to accommodate the right drive spindle 56. This cutout 192 and the opening 194 expose a rotatable connecting member 196 which can be turned to securely engage the end 190 of the ribbon 48.

The cartridge 174 is mounted securely in the cassette housing 46 by inserting the cartridge 174 downwardly in the top wall opening 188. This opening 188 is formed with four recesses 198 which match the location of the locking tabs 178. With the cartridge top wall 176 positioned in the opening 188, this cartridge 174 can be rotated slightly in a clockwise direction so that the locking tabs 178 engage the lip at the opening 188, thus holding the cartridge 174 securely in place.

Figure 9:
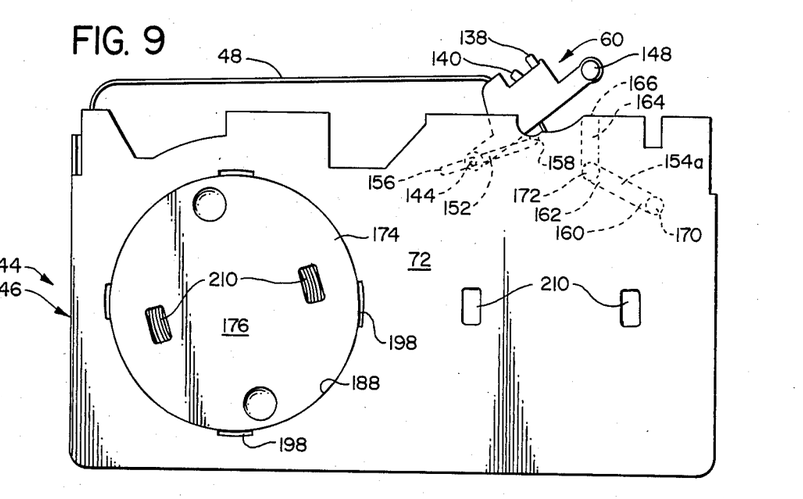
FIG. 9 is a view similar to FIG. 7, showing the cleaning cartridge being inserted into the cassette housing.
Figure 10:
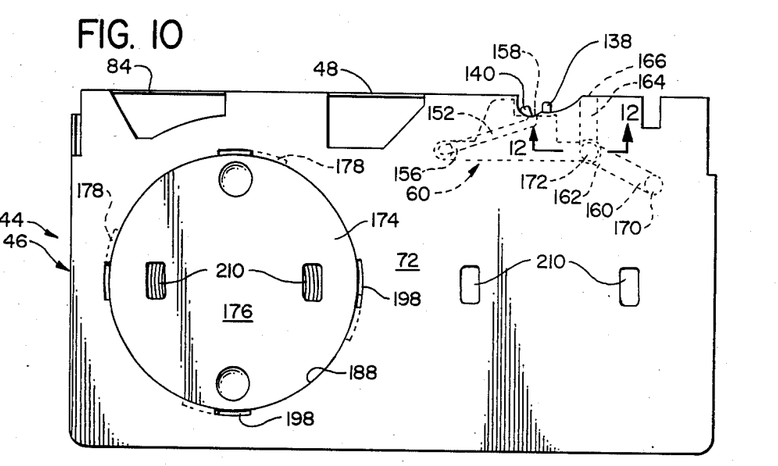
FIG. 10 is a view similar to FIG. 9, illustrating the cleaning cartridge being positioned fully in place in its left hand position.
Figure 11:
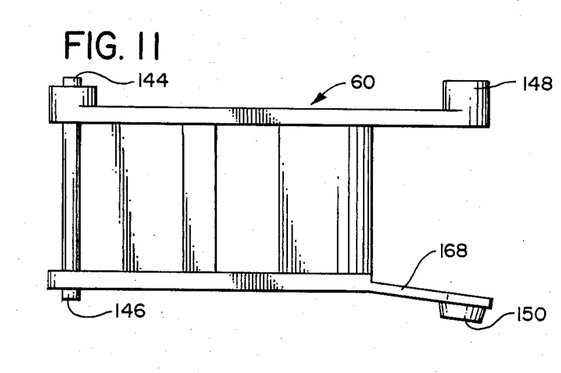
FIG. 11 is a view taken at the location of line 11—11 of FIG. 7.

Then the capstan and pinch roller cleaning cartridge 60 can be securely mounted in the cassette housing 46 by first positioning the two left locating pins 144 and 146 in the slots 152 and moving these pins 144 and 146 to the left, as illustrated in FIG. 9. Then the right locating pins 148 and 150 are moved to become engaged in the forwardly extending slots 164a and 164b and moved rearwardly to the location of the left opening 172, which is the juncture of the right pair of slots 154a and 154b with the forward pair of slots 164.

With the cleaner so assembled, the operation of a cleaning cycle of the cleaner 44 will now be described. The cleaner 44 is shown in FIG. 1 to be in a position to begin a cleaning cycle. The cassette housing 44 is placed in the existing playing location or cavity 14 of the unit 10. The cleaning ribbon 48 is wound mostly on the left spool 50, and attached to the right spool 52, but not being wound thereon to any great extent. The stop shield is positioned so that the light beam from the light source 92 is directed to the right at a moderate rearward slant. The ribbon 48 is in its retracted position so that the forward ribbon portion 84 extends across the front of the cassette housing 46 so as to be in front of the five guide members 34-42 of the existing unit 10. Further, the capstan and pinch roller cleaning cartridge 60 is in its left hand position so that the ribbon 48 does not extend between the capstan 28 and pinch roller 30.

With the cleaner 44 so located, the start button or knob of the unit 10 is moved to its operating position, which in the normal operation of the unit 10 would extract the magnetic tape from its case or housing and move it out into engagement with the various operating components of the unit 10. With respect to the present invention, the starting of the unit 10 causes the five guide members 34-42 to engage the backside of the front ribbon portion 84 and move the ribbon outwardly so that it comes into engagement with the erase head 16, the guide member 27, the video head 18, and the audio head 20. This operating position is shown in FIG. 3. Also, the pinch roller 30 moves rearwardly toward the capstan 28, as shown in FIG. 3, with the capstan 28 being engaged by the pad finger 138, and the pinch roller 30 coming into engagement with the other cleaning pad finger 140. The rotation of the capstan 28 and pinch roller 30 causes a cleaning action of their surfaces against the pad fingers 138 and 140.

At the same time, due to the normal operation of the unit 10, the right and left drive spindles 54 and 56 begin rotating in a clockwise direction so as to cause the cleaning ribbon 48 to move along the ribbon path shown in FIG. 3, and thus come into wiping engagement with the components 16, 18, 20 and 27 of the unit 10. As the right spool 52 rotates, it acts through the gear transmission 90 to rotate the shield 88 at a relatively slow rate. By the time the two spools 50 and 52 have completed about 4 to 5 revolutions, the shield 88 has rotated nearly a half of a revolution to the position shown in FIG. 4, so that a light beam (shown at 200) directed through the window 98 strikes the left shut off device 94 to trigger the automatic shut off mechanism to the unit 10. The cleaning ribbon 48 is made of a fibrous material which has a somewhat open fibrous structure so that, while the light beam 200 is obscured to some extent, a large portion of the light energy can pass through the ribbon 48.

When the shut off device 194 is activated, the unit 10 responds by automatically going into its rewind mode. This causes the guide members 32-42 to move back to the retracted position of FIG. 1, and also causes the left spool 50 to begin rotating in a counterclockwise direction to wind the cleaning ribbon 48 thereon. As the two spools 50 and 52 continue to rotate, the gear transmission 90 causes the light shield 88 to rotate in a counterclockwise direction back toward the position of FIG. 1. When the shield 88 reaches the position of FIG. 1 and continues to rotate in the counterclockwise direction, the window 98 of the shield 88 causes the light beam (indicated at 200a) to be directed through a lens 202 that is located just to the right of the shield 88. There are a pair of mirrors 204 and 206 arranged to reflect the beam 200a through a right opening 208 to activate the right shut off device 96. More specifically, the mirror 204 is positioned just to the right of, and behind the location of the right opening 170. This mirror 204 is positioned at approximately a 45° angle relative to a front to rear axis of the cassette housing 46 so that the light beam 200a which is traveling from the lens 202 in a lateral direction to the right is reflected in a forward direction at 200b. The other mirror 206 is located forwardly from the mirror 204 and has its reflective surface directed in a rearward direction at 45° from the front to rear axis of the cassette housing 46. This causes the light beam at 200b to be reflected toward the right at 200c so that it is able to pass through the right opening 208 and activate the right shut off device 96.

The reason for the arrangement of the lens 202 and the mirrors 204 and 206 is that the placement of the capstan and pinch roller cleaning cartridge 60 interferes with the normal path of the light beam from the light source 92 to the right shut off device 96, particularly when the cleaning cartridge 60 is in the right hand position of FIG. 4. The lens 202 concentrates the light beam so that it is of greater intensity. Thus, as the beam 200a is reflected from the two mirrors 204 and 206 (thus losing intensity by traveling a longer path, in addition to the loss of intensity by being reflected), the beam has sufficient intensity to activate the shut off device 96.

As indicated previously, in some units 10 of the general type described above, the automatic shut off mechanism becomes activated when the capstan 28 and pinch roller 30 are not engaging the ribbon 48 and not moving the ribbon through the unit 10. The reason for this is that the right take-up spool of the conventional tape cassette must then generate the entire force necessary to pull the ribbon 48 through the unit 10. If this force is too great, the shut off mechanism in the unit 10 becomes activated.

When this situation exists, the capstan and pinch roller cleaning cartridge 60 is moved to the right hand position shown in FIG. 5, in the manner described above. To review this briefly, a pencil or other sharp object is positioned adjacent the bottom wall 70 of the housing 46 to move the lower right locating pin 150 upwardly and out of the opening 172. This permits the cartridge 60 to be moved laterally to the position of FIG. 5.

After the cartridge 60 is so positioned, the cleaner 44 is again inserted into the playing location or cavity 14 of the unit 10, with the result that not only does the ribbon 84 extend in front of the guide members 34–42, but there's also an additional front ribbon portion which extends at 84a in front of the capstan 28. Thus, when the start button of the unit 10 is moved to its operating position, not only do the guides 34–42 move the ribbon 84 to its cleaning position, as shown in FIG. 6, but the capstan 28 and pinch roller 30 engage the cleaning ribbon 84 therebetween. The passing of the ribbon 84 between the capstan 28 and pinch roller 30 provides some cleaning action of these surfaces during the cleaning operation.

If, in spite of the automatic shut off which occurs as described above, it is still desired to have the cleaning action of the stationary pad 136 engaging the capstan 28 and pinch roller 30, then the cartridge 60 can be moved back to the left hand position, as shown in FIG. 1. Generally, after the unit 10 is started, the capstan 28 and pinch roller 30 will rotate at least for a short increment of time before the automatic shut off mechanism becomes activated. By starting the unit 10 several times in a row after the occurrence of each shut off, there will be sufficient wiping action of the capstan 28 and pinch roller 30 against the pad fingers 138 and 140 to cause adequate cleaning.

The housing 46 and the top wall 176 of the cartridge 174 have four sets of access openings 210. Each set of openings 210 is positioned adjacent one of the two spools 50 and 52 at the location where the ribbon 48 is wound on the spool 50 or 52. Each set of openings 210 is approximately 180° apart, relative to the circumference of the spool 50 or 52. A suitable cleaning fluid can be inserted through selected holes 210 to wet the ribbon 48 at spaced locations along the length thereof.

In the preferred form, the ribbon 48 has a length several times greater than the length required to permit the ribbon 48 to travel through a single cleaning cycle. Thus, after one portion of the ribbon 48 becomes used a number of times, it is possible to move the ribbon 48 further from one spool 50 or 52 to the other to cause a new section of the ribbon 48 to be used in cleaning the components of the unit 10. This can be conveniently accomplished by manually rotating the two spools 50 and 52 by gripping them through the openings in the bottom wall 70.

As a further feature, each of the spools 50 and 52 can be provided with a spring-like arm 212 at the upper surface of the spools 50 and 52. These arms 212 exert a moderate downward force on the spools 50 and 52 by pressing against the surface of the structure immediately above. This places a moderate frictional force on the spools 50 and 52 so that, as the cleaner is ejected from the housing, the ribbon 48 is not permitted to be jostled out of its proper position where it fits closely against the front wall 62 of the housing 46.

It is obvious that various modifications could be made to the apparatus and method of the present invention without departing from the basic teachings thereof.

What is claimed:

1. A cleaning apparatus to clean a playing and/or recording apparatus, wherein said playing and/or recording apparatus comprises:
   (a) a structure defining an operating location to receive a tape cassette in an operating position in the operating location;
   (b) at least one head member which has a head surface that is subject to contamination;
   (c) guide means adapted to engage a tape of said tape cassette at a tape engaging location and move said tape outwardly to a head engaging location;
   (d) a capstan and pinch roller at a capstan and pinch roller location to engage the tape and move said tape through the playing and/or recording apparatus;
   (e) drive spindles to engage spools of said tape cassette so as to cause rotation of the same;
   said cleaning apparatus comprising:
   (a) a cassette housing adapted to be positioned in the operating location of the playing and/or recording apparatus, said cassette housing having a forward end, a rear end and first and second side portions;
   (b) a cleaning ribbon having a lengthwise axis and positioned in said cassette housing so as to have a guide engaging ribbon portion which, with said cassette housing located in the operating location, is positioned to be engaged by said guide means and moved from said cassette housing into a cleaning position to be in cleaning engagement with at least said head, said ribbon being so mounted in said cassette housing so as to be able to travel from and into said cassette housing in a path along the lengthwise axis of the ribbon;
   (c) a capstan and pinch roller cleaning device mounted in the cassette housing and having a first cleaning position to engage the capstan and pinch roller in cleaning engagement at the capstan and pinch roller location, said cleaning device being movable to a second location removed from said capstan and pinch roller location;
   (d) a ribbon locating means having a first locating mode to locate said ribbon on a path bypassing said capstan and pinch roller, and a second locating mode to locate the ribbon between the capstan and pinch roller;
   whereby, with said cleaning device in its first cleaning position and the ribbon locating means is its first locating mode, said cleaning device is able to be in cleaning engagement with the capstan and pinch roller with said ribbon bypassing said capstan and pinch location and the ribbon locating means in its second locating mode, said ribbon is engaged by the capstan and pinch roller to be moved by the capstan and pinch roller in its path along the lengthwise axis of the ribbon.

2. The cleaning apparatus as recited in claim 1, wherein said capstan and pinch roller cleaning device and said ribbon locating means are mounted to a cartridge which is in turn movably mounted in said cassette housing, with said cartridge being movable between first and second cartridge locations to move said cleaning device between its first and second locations and to move said ribbon locating means between its first and second locating modes.

3. The cleaning apparatus as recited in claim 2, wherein said cartridge and said cassette housing have cooperating slot and pin positioning means whereby said cartridge can be moved between its first and second locations along said positioning means.

4. The cleaning apparatus as recited in claim 3, wherein said pin and slot positioning means comprises a first slot means formed in said cassette housing and extending in a lateral direction, and a second slot means formed in said cassette housing and also exstending in a generally lateral direction, said cartridge having first and second pin means interfitting with said first and second slot means.

5. The cleaning apparatus as recited in claim 4, wherein said first and second slot means are located on opposite sides of said capstan and pinch roller cleaning device and at least one of said slot means is slanted from a lateral axis so as to cause rotation of said cartridge as it is moved between its first and second locations.

6. The cleaning apparatus as recited in claim 5, wherein at least one of said pin means is mounted to a yielding member which is adapted to engage first and second locating detents in said cassette housing to locate said cartridge in its first and second locations.

7. The apparatus as recited in claim 4, wherein said first and second slot means are provided with an end portion opening from said cassette housing, whereby said cartridge can be employed as a removable cartridge to be inserted into cassette housing and removed therefrom.

8. The cleaning apparatus as recited in claim 4, wherein at least one of said pin means is mounted to a yielding member which is adapted to engage first and second locating detents in said cassette housing to locate said cartridge in its first and second locations.

9. The apparatus as recited in claim 8, wherein said first and second slot means are provided with an end portion opening from said cassette housing, whereby said cartridge can be employed as a removable cartridge to be inserted into the cassette housing and removed therefrom.

10. The cleaning apparatus as recited in claim 1, wherein said playing and/or recording apparatus has a shut off mechanism comprising first and second shut off devices spaced from one another, one of said shut off devices being a light emitting member, and the other of said shut off devices being a light responsive member, said shut off device being positioned so that when the tape cassette is in the operating location, the tape is positioned to interrupt a light beam travelling a light beam path between said first and second shut off devices, and when a shut off leader of said tape is at said light beam path, said shut off mechanism is activated, said cleaning apparatus comprising a shield member having a beam interrupting position to interrupt the light beam path between said shut off devices, and a beam transmitting position to permit the light beam to travel on the light beam path between the shut off devices, said cleaning apparatus further comprising a drive transmission adapted to be operatively engaged with one of said drive members of the playing and/or recording apparatus to move said shield between its first and second positions, whereby said cleaning apparatus can be caused to move through a cleaning cycle as the drive transmission moves the shield from the first to the second stop positions.

11. The cleaning device as recited in claim 10, wherein said shield member comprises a rotatable member positioned around one of said shut off devices, and said transmission comprises a speed reducing transmission to rotate said shield at a rotational rate slower than rotation of said drive member to which the transmission is operatively connected.

12. The cleaning apparatus as recited in claim 11, wherein said transmission comprises a speed reducing gear tranmission operatively connected between said shield and said drive member.

13. The apparatus as recited in claim 12, wherein said cleaning apparatus further comprises a pair of spools mounted in said cassette housing and adapted to have said ribbon wound thereon, at least one of said spools being provided with gear means to operatively engage said gear transmission, whereby rotation of said spool to move said ribbon causes rotation of said shield.

14. The cleaning apparatus as recited in claim 1, wherein there are mirror means to reflect said light beam on a nonlinear path between said first and second shut off devices.

15. The cleaning apparatus as recited in claim 14, said cleaning apparatus further comprising lens means located on said light beam path to concentrate said light beam to an intensity sufficient to activate the shut off mechanism.

* * * * *